No. 637,145. Patented Nov. 14, 1899.
G. MOFFAT & E. J. DOBBINS.
LIGHT PROJECTING GLASS.
(Application filed June 9, 1899.)
(No Model.)
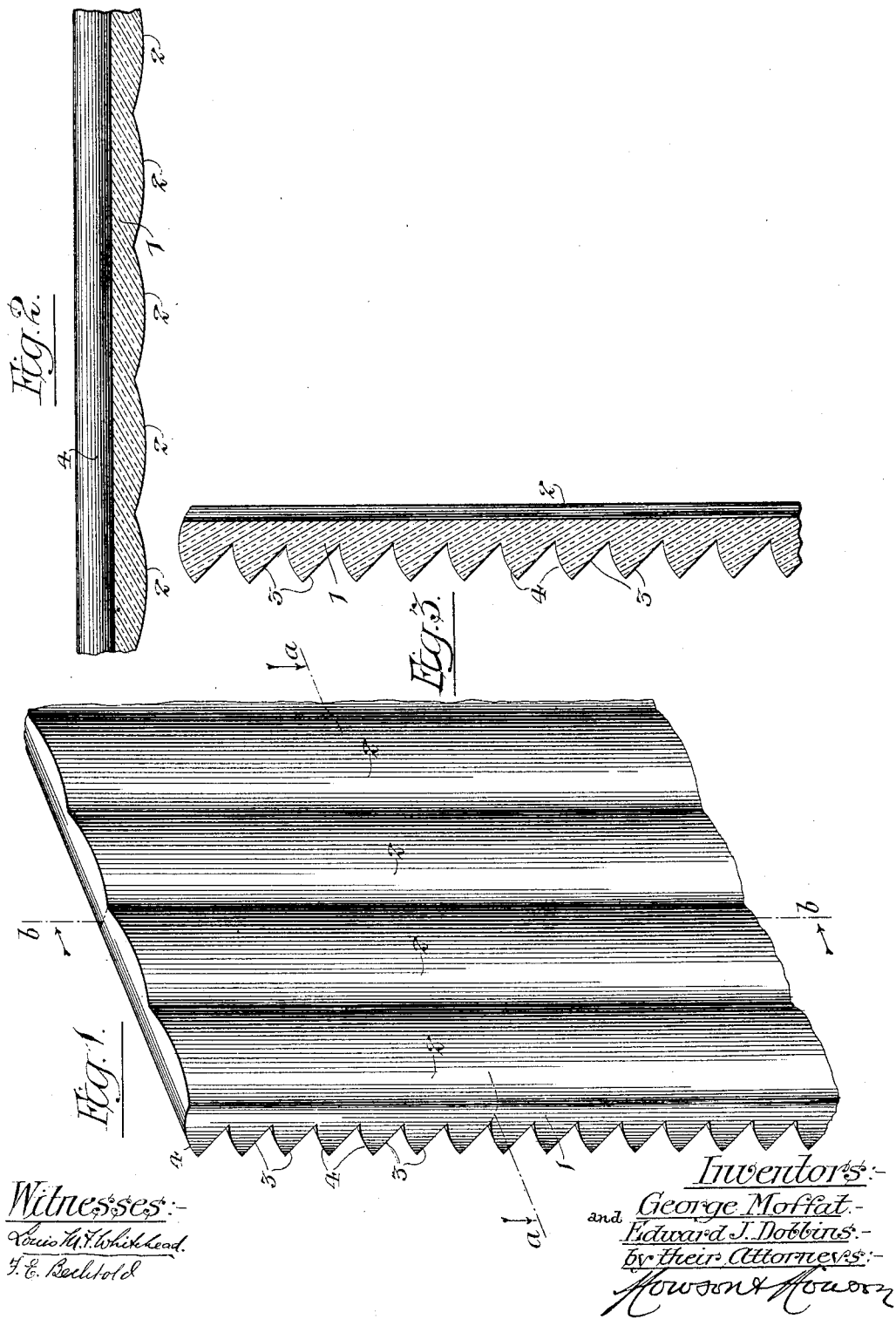
Witnesses:
Louis M. F. Whitehead.
F. E. Bechtold.
Inventors:
George Moffat
and Edward J. Dobbins.
by their Attorneys:
Howson & Howson

UNITED STATES PATENT OFFICE.

GEORGE MOFFAT AND EDWARD JOHN DOBBINS, OF PHILADELPHIA, PENNSYLVANIA.

LIGHT-PROJECTING GLASS.

SPECIFICATION forming part of Letters Patent No. 637,145, dated November 14, 1899.

Application filed June 9, 1899. Serial No. 719,895. (No model.)

*To all whom it may concern:*

Be it known that we, GEORGE MOFFAT and EDWARD JOHN DOBBINS, citizens of the United States, and residents of Philadelphia, Pennsylvania, have invented certain Improvements in Light-Projecting Glasses, of which the following is a specification.

Our invention relates to that class of light-projecting glasses which have upon one side a series of parallel prism-bars for refracting or reflecting the light, the object of our invention being to so construct such a light-projecting glass that the field from which the same receives its light will be enlarged and greater diffusion of the light effected, so as to materially increase the area to which light is supplied by the glass.

In the accompanying drawings, Figure 1 is a perspective view of a piece of light-projecting glass constructed in accordance with our invention. Fig. 2 is a section of the same on the line *a a*. Fig. 3 is a section on the line *b b*.

Our improved light-projecting glass has upon one side parallel prism-bars 1 and upon the opposite side parallel lens-bars 2, disposed substantially at a right angle in respect to the prism-bars, these lens-bars presenting outer convex faces, as shown in Fig. 1. In the present instance each of the prism-bars has a plane face 3 and a curved or lens-like face 4, for a purpose explained hereinafter; but other forms of prism-bar may be used without departing from the main feature of our invention. The purpose of such lens-bars is to materially increase the effective area of the source from which the glass derives its illumination, lateral rays being caught and transmitted by the convex surfaces of the lens-bars, which would be lost by reflection from a flat surface or from a glass presenting a considerable area of flat surface on the light-receiving side, all of the rays, moreover, being refracted by the lens without that interference with each other which is an objection to light-projecting glasses in which some of the light is transmitted directly, while other rays are refracted and reflected across the path of the direct rays, thus causing interference which materially detracts from the light-projecting properties of the glass. The lens-bars also serve to cause lateral diffusion of the light projected by the glass, and thereby correspondingly increase the area which can be effectively illuminated.

We wish to avoid all internal reflection from the lens-surface of the glass when said lens-surface is presented to the incident ray, and for this reason the lens-bars are shallow or of such a considerable radius of curvature that an incident ray striking any part of the curved surface of the lens-bar and refracted thereby cannot reach any internal surface of the lens-bar so as to be reflected, but will, after refraction, pass directly through the glass until it reaches the opposite prism-surface.

One of the advantages of a light-projecting glass constructed in accordance with our invention is that it may be used effectively in the manner shown—that is to say, occupying a relation in respect to the upper portion of the window-opening which is the reverse of the usual awning or canopy position, thereby permitting the direct transmission of light through the upper portion of the window-opening in addition to that which is projected therethrough by the glass, thus insuring the lighting of an area close to the window and overcoming a defect in prism-glasses as ordinarily used, which rob the areas near the window-openings of light for the benefit of the portions to which the latter is projected.

We may state that one of the incidental advantages of our invention is that the lens-bars very materially increase the strength of the glass and permit us to produce glasses of larger area than is possible in making light-projecting glasses of ordinary character.

Having thus described our invention, we claim and desire to secure by Letters Patent—

A light-projecting glass, having upon one face a series of prism-bars, and upon the other face a series of shallow lens-bars, disposed substantially at a right angle to the prism-bars and presenting outer convex faces of such radius of curvature that an incident ray, striking any part of the convex surface, and refracted thereby, will pass through the glass without reflection from an internal surface of the lens-bar, substantially as specified.

In testimony that we claim the foregoing as our invention we have signed our names, in presence of two witnesses, this 2d day of June, 1899.

GEORGE MOFFAT.
EDWARD JOHN DOBBINS.

Witnesses:
FRANK N. BOOZ,
HENRY A. JAMES.